United States Patent
Wolodko et al.

(10) Patent No.: US 8,636,057 B2
(45) Date of Patent: Jan. 28, 2014

(54) SHEAR COUPLING ASSEMBLY FOR USE WITH ROTARY AND RECIPROCATING PUMPS

(75) Inventors: Benny B. Wolodko, Edmonton (CA); Hermann Basler, Stony Plain (CA); Jonathan Paul Penner, Edmonton (CA)

(73) Assignee: Weatherford/Lamb, Inc., Houston, TX (US)

( * ) Notice: Subject to any disclaimer, the term of this patent is extended or adjusted under 35 U.S.C. 154(b) by 370 days.

(21) Appl. No.: 12/959,974

(22) Filed: Dec. 3, 2010

(65) Prior Publication Data

US 2011/0150596 A1    Jun. 23, 2011

(30) Foreign Application Priority Data

Dec. 17, 2009    (CA) .................................... 2688801

(51) Int. Cl.
    *E21B 19/02*    (2006.01)
(52) U.S. Cl.
    USPC .................. 166/77.51; 166/75.11; 166/68.5
(58) Field of Classification Search
    USPC ............ 166/75.11, 68.5, 72, 77.51, 77.512; 403/2
    See application file for complete search history.

(56) References Cited

U.S. PATENT DOCUMENTS

| | | |
|---|---|---|
| 3,967,906 A | 7/1976 | Strizki |
| 4,411,546 A | 10/1983 | Fischer |
| 4,430,018 A | 2/1984 | Fischer |
| 4,459,060 A | 7/1984 | Patterson |
| 4,720,204 A | 1/1988 | Johnson |
| 5,201,814 A | 4/1993 | Kitchell |
| 5,360,239 A | 11/1994 | Klementich |
| 5,449,259 A | 9/1995 | Clohessey |
| 5,505,502 A | 4/1996 | Smith et al. |
| 5,938,383 A | 8/1999 | Dirmeier et al. |
| 2004/0202521 A1 | 10/2004 | Bostik |
| 2008/0066901 A1 | 3/2008 | Gereluk |
| 2009/0271966 A1 | 11/2009 | Fotty et al. |

FOREIGN PATENT DOCUMENTS

| | | |
|---|---|---|
| CA | 1298715 | 8/1988 |
| CA | 1298715 | 4/1992 |
| CA | 2425091 | 4/2003 |
| FR | 2891330 A1 | 9/2005 |
| WO | 02/099292 A1 | 12/2002 |

OTHER PUBLICATIONS

Weatherford, "Weatherford Sucker Rods," Brochure, copyright 2003.

(Continued)

*Primary Examiner* — Brad Harcourt
(74) *Attorney, Agent, or Firm* — Wong, Cabello, Lutsch, Rutherford & Brucculeri, LLP

(57) ABSTRACT

A shear coupling assembly utilizes a second coupling member, a first coupling member and a locking member which is inserted into a bore in the first coupling member to connect between the second coupling member and the first coupling member. In embodiments where a pretension is applied to the shear neck, the locking member maintains the pretension in the shear neck. The bore of the first coupling member has a profiled section which corresponds to a profiled section on the second coupling member which when mated together permit torque to be transferred for co-rotating the second coupling member with the first coupling member for use in rotary pump operations. Advantageously, the profiled portions and the shear neck are encased in the bore of the shear coupling assembly and are protected from corrosive wellbore fluids.

33 Claims, 10 Drawing Sheets

(56) References Cited

OTHER PUBLICATIONS

Weatherford, "Sucker Rod Couplings," obtained from http://www.weatherford.com, generated Dec. 19, 2006, copyright 2006.
Plainsman Mfg., Inc., "Plainsman Sear Couplings," Brochure, dated Oct. 23, 2006.
UK Search Report for UK Appl. No. GB0717917.9, dated Jan. 14, 2008.
International Search Report and Written Opinion, dated Feb. 1, 2011 in corresponding matter, Serial No. PCT/US2010/058920.
First Examination Report in counterpart Australian Appl. 2010332110, dated Jun. 21, 2013.
Letter detailing First Office Action in counterpart Columbian Appl. 12.100.595, dated Jul. 25, 2013.
Letter detailing Second Office Action in counterpart Columbian Appl. 12.100.595, dated Nov. 20, 2013.
Notice of Acceptance in counterpart Australian Appl. 2010332110, dated Oct. 4, 2013.

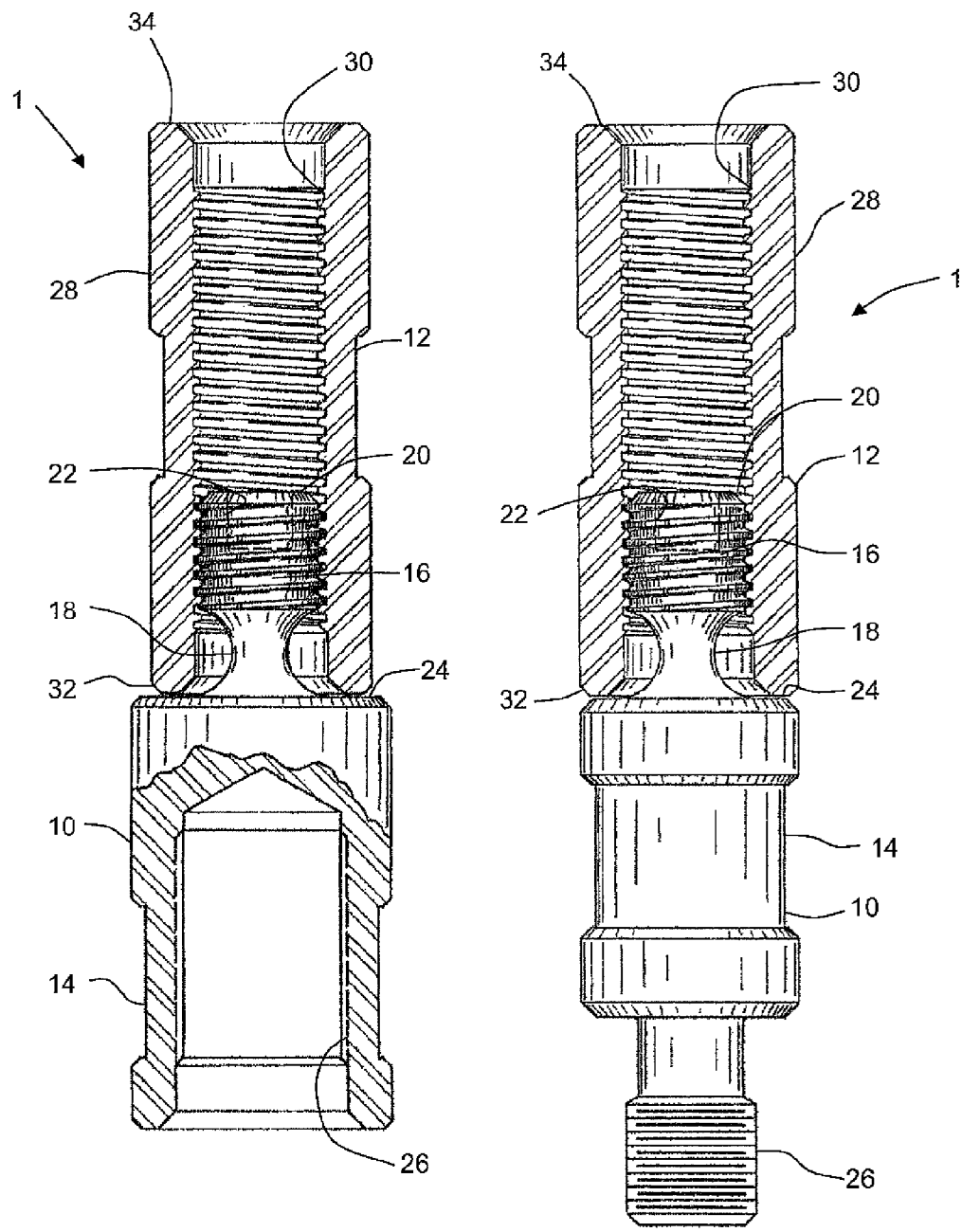

A - A

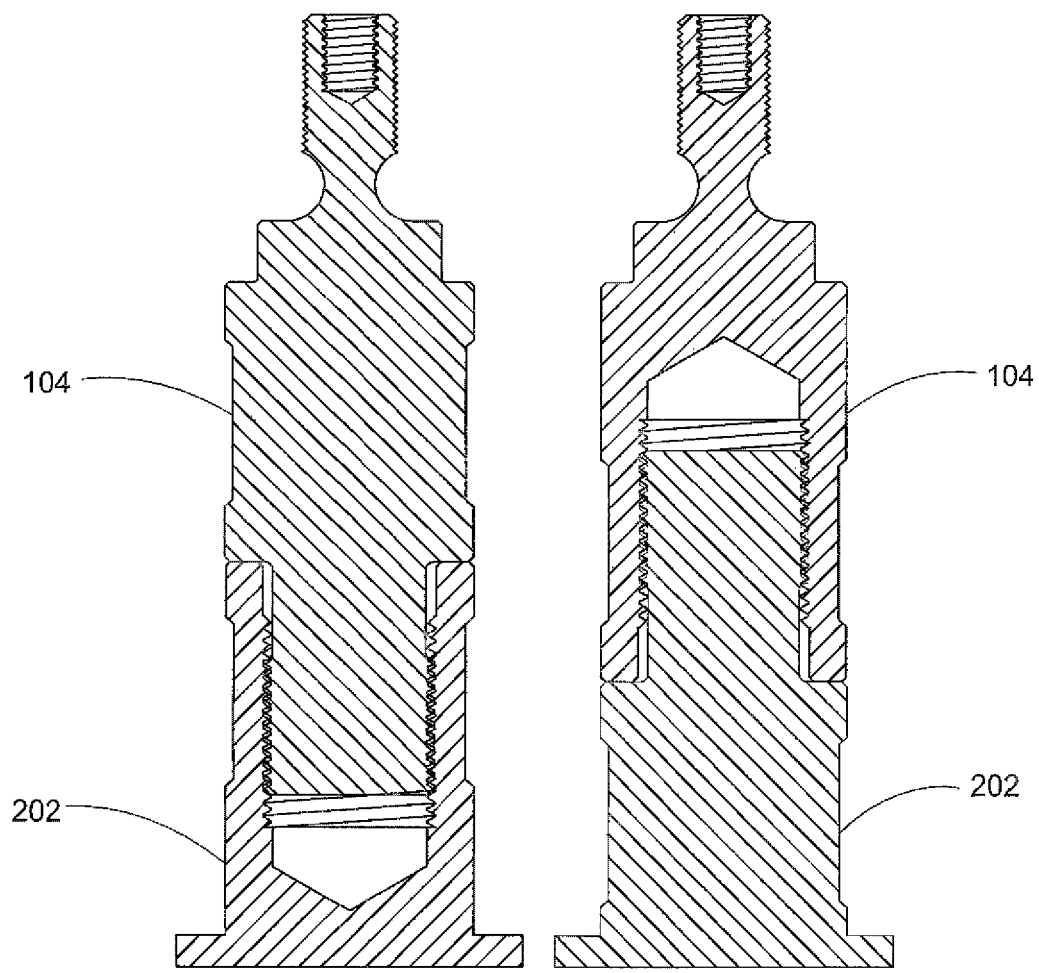
*Fig. 16A*   *Fig. 16B*

SHEAR COUPLING ASSEMBLY FOR USE WITH ROTARY AND RECIPROCATING PUMPS

CROSS REFERENCE TO RELATED APPLICATION

The present application claims priority to Canadian Application 2,688,801 filed on 17 Dec. 2009, the contents of which are incorporated herein by reference.

FIELD OF THE INVENTION

Embodiments of the invention relate to a shear coupling assembly used for connecting a downhole pump to a terminal end of an actuating rod string in pumped wells, and more particularly to a shear coupling for use with rotationally driven rod pumps.

BACKGROUND OF THE INVENTION

Downhole reciprocating and rotary pumps are positioned and actuated in a wellbore by a rod string extending from surface. The rod string is typically either one continuous member or a plurality of sucker rods, connected end-to-end through standard threaded couplings.

It is known that downhole pumps may become lodged or stuck in a wellbore, often by sand deposited and packed around the pump, either at the downhole pumping location or as the pump is being tripped out of the wellbore. Conventionally, the rod string is removed from the pump by applying a pulling force on the rod string to sever the rod string from the pump.

A shear coupling assembly is typically used to connect between the pump and a downhole end of the rod string. The shear coupling primarily functions to provide a means for separating the rod string from a stuck pump so as to release and remove the rod string from the wellbore and permit specialized equipment to be inserted into the well annulus to free the pump. Use of the shear coupling at the interface between the rod string and the pump provides a specified location at which the pump and rod string are separated and the shear coupling can be constructed to actuate under a desired design load which is highly predictable. Without the shear coupling, the rod string would sever at a location along the rod string that is unknown and largely unpredictable and which can be problematic for retrieval of the pump.

It is known to use a shear coupling comprising transversely extending shear pins for joining male and female coupling members between the pump and the rod string. The shear pins are known to be prone to premature fatigue which arises from cyclic compressive stress induced in the shear pins in a reciprocating pump if the rod string "taps down" at the base of each reciprocating stroke. Further, in either a reciprocating or rotary pump, as the shear pins break, fragments fall downhole into the pump, resulting in further problems in freeing the pump.

In an effort to solve the problems associated with previous shear coupling designs, shear couplings, such as taught in Canadian Patent 1298715 to Mann et al, are known to utilize a threaded connection between a pin coupling member, having an externally threaded head, and an internally threaded box coupling member. Either of the pin coupling member or the internally threaded box coupling member is connected to the pump and the other is connected to the downhole end of the rod string. The threaded head of the pin coupling member threadedly engages the internal axial bore of the internally threaded coupling member for operatively connecting therebetween. The pin coupling member further comprises a shear neck of reduced diameter between the head and a body of the pin coupling member which is designed to shear under design load to free the pump from the rod string.

During assembly, a pretension is typically applied to the shear neck of the pin coupling member during threaded connection to the box coupling. The box coupling seats on a shoulder of the pin coupling so as to maintain the shear neck in tension during normal operation of the pump for preventing premature fatigue of the shear neck. Shear couplings of this design are particularly suited for use in reciprocating pumps but are not useful for rotary pumps as the shear element would take virtually 100% of the torsional load.

Canadian Patent 2,425,091 to Bostik teaches a one-piece shear coupling for use with both rotary and reciprocating pumps. The shear coupling comprises a cylindrical body which is adapted at one end for connection to a rod string and at the other end to the pump. A weakness, such as a groove, is formed in the body therebetween so as to provide a stress-concentration point for shearing upon being subjected to a predetermined amount of stress. At least the groove must be treated with an anti-corrosive material as the entirety of the cylindrical body is exposed to potentially corrosive wellbore fluids. One of skill in the art would understand that if designed for tensile loading, the addition of torsional loading as a result of rotary operation would result in premature failure. Further, in the case of axial operations, the groove acts as a stress concentration when subjected to bending forces, such as in a deviated wellbore.

There is continued interest in the industry for shear coupling assemblies which provide reliable shearing under design conditions while avoiding the problems associated with parts which may fall into the wellbore or pump after shearing, avoid the effects of corrosive wellbore fluids, are relatively simple and inexpensive to manufacture, and can be used in both reciprocating and rotary pump applications.

SUMMARY OF THE INVENTION

A shear coupling assembly for drivably connecting between a downhole end of a rod string and a pump for use with both rotary and reciprocating pumps. The shear coupling assembly comprises a first coupling member and a second coupling member having a co-operating substantially irregular male profile and a substantially irregular female profile for mating therebetween, so as to permit transfer of torque and co-rotation during rotary pump operations. A locking member inserted into an axial bore of the first coupling member engages between the first coupling member and the second coupling member to prevent separation therebetween during rotary and reciprocating operations. A shear neck, formed on the second coupling member for permitting separation of the assembly under design loading, is positioned in an axial bore in the first coupling member when assembled and is isolated therein from corrosive fluids in the wellbore. A pretension may be applied to the shear neck to enhance fatigue resistance particularly in reciprocating pump operations or where there are deviations in the wellbore causing rotational bending in rotary pump operations. The locking member further acts to maintain the pretension, if applied.

Advantageously, in embodiments of the invention, torsional loading is applied through the mated profiles and not through the shear neck. Further, the mated profiles are located within the axial bore of the shear coupling assembly and are also protected from corrosive fluids in the wellbore, further improving fatigue resistance.

In one broad aspect of the invention, a shear coupling assembly for connecting between a downhole pump and a downhole end of a rod string, comprises a shear coupling assembly for driveably connecting between a downhole pump and a downhole end of a rod string comprising: a first coupling member, adapted for connection to one or other of the pump or rod string, having a tubular body and an axial bore formed therethrough, at least a portion of the axial bore having a substantially irregular female profile formed therein; a second coupling member, adapted for connection to one or other of the pump or rod string, having a cylindrical body, a cylindrical insert member extending axially upward therefrom, a shear neck connecting between the cylindrical body and the cylindrical insert member and a substantially irregular male profile formed on the cylindrical body below the shear neck for mating with the substantially irregular female profile of the first coupling member, for driveably engaging the first and second coupling members for co-rotation; and a locking member for insertion into the axial bore of the first coupling member for engagement between the axial bore of the first coupling member and the cylindrical insert member of the second coupling member for axial coupling therebetween.

In another broad aspect of the invention, a method of assembling a shear coupling assembly comprises: a method of assembling the shear coupling assembly of claim 1 wherein the cylindrical insert member comprises external threads, comprising: inserting the cylindrical insert member of the second coupling member upwardly into a lower end of the axial bore of the first coupling member, the cylindrical insert member passing the upper shoulder in the axial bore; mating the substantially irregular male profile of the second coupling member with the substantially irregular female profile of the first coupling member for co-rotation therebetween; inserting the locking member into an upper end of the axial bore of the first coupling member; threading the locking member onto the cylindrical insert member until a lower end of the locking member engages the upper shoulder in the axial bore of the first coupling member for maintaining axial coupling therebetween.

BRIEF DESCRIPTION OF THE DRAWINGS

FIG. 1 is a sectional side view of a prior art shear coupling assembly;

FIG. 2 is a partial sectional side view of an alternate embodiment of the prior art shear coupling assembly of FIG. 1;

FIGS. 16A and 16B are longitudinal sectional views of a second coupling member of the shear coupling assembly of FIGS. 4 and 5 affixed to an anvil of the assembly apparatus, more particularly FIG. 16A illustrates an anvil suitable for affixing a pin coupling member; and FIG. 16B illustrates an anvil suitable for affixing a box coupling member.

DETAILED DESCRIPTION OF THE PREFERRED EMBODIMENT

Figures 3, 13:
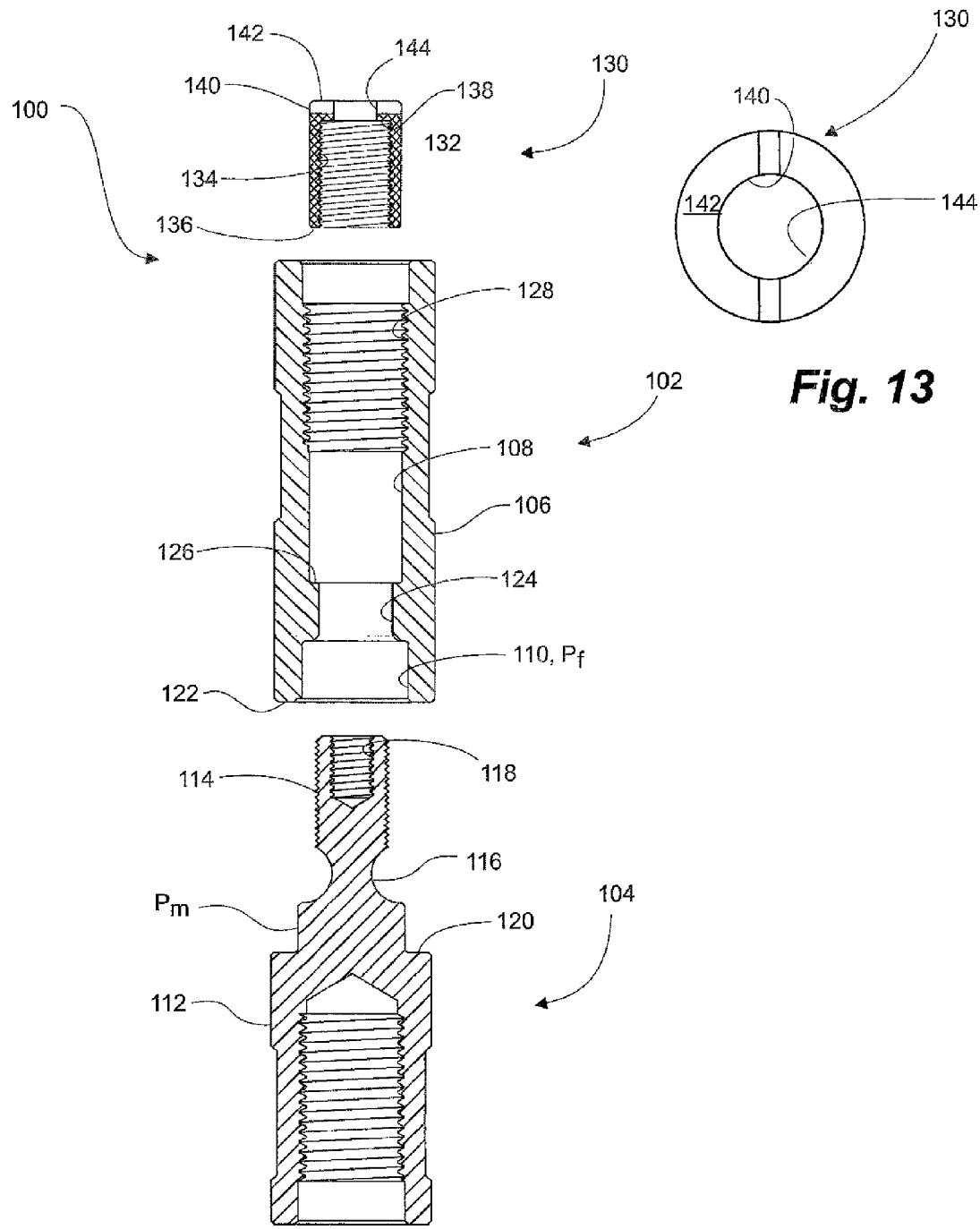
FIG. 3 is an exploded sectional view of a shear coupling assembly according to an embodiment of the invention, illustrating a first coupling member, a second coupling member and a locking member.
FIG. 13 is a plan view of the locking member according to FIG. 3, illustrating an opening in a top for accessing a bore therethrough and a discontinuous diametral slot for engaging a tool end.

Embodiments of the invention relate to improvements to prior art shear coupling assemblies to permit use with both reciprocating and rotary pump applications. A description of a conventional shear coupling assembly and method of assembly is provided to assist in understanding embodiments of the invention and the advantages therein.

Prior Art Shear Coupling Assembly

Having reference to FIGS. 1 and 2, a conventional prior art shear coupling assembly 1, applicable to reciprocating pump applications only, comprises two members, a pin coupling member 10 and a box coupling member 12. Either of the pin or box coupling member 10, 12 can be connected to either of a pump or a rod string (not shown) for permitting connection therebetween.

The pin coupling member 10 comprises a cylindrical body 14 having an insert member 16 with external threads extending axially outwardly therefrom and connected to the body 14 by a shear neck 18 typically having a relatively reduced section. The insert member 16 is cylindrical and smaller in diameter than the cylindrical body 14. The reduced section of the shear neck 18 has a known cross-sectional area and acts as a preferential point of parting in the connection between the rod string and the pump under design loading. A top 20 of the insert member 16 is bored with an internally threaded axial counterbore 22 adapted for use for pretensioning the shear neck 18 during assembly, as described below. The pretension in the shear neck 18 is maintained through a seating interface between the pin and box coupling members 10, 12 along a radial contact shoulder 24 formed at a top of the cylindrical body 14. The body 14 further comprises a threaded connection 26 at an end opposite the insert member 16 for threaded connection to either the rod string or the pump and can be either a female connection (FIG. 1) or a male connection (FIG. 2) as shown.

The box coupling member 12 comprises a tubular body 28 having an internal, threaded, axial bore 30 that co-operates with a thread profile of the externally threaded insert member 16 and which extends substantially a full length of the axial bore 30. A first end 32 of the tubular body 28 is connected to the pin coupling member 10 at the externally threaded insert member 16. A second end 34 of the body tubular body 28 is threadedly connected to either the rod string or the pump.

Prior Art Method of Assembly

In an embodiment of a prior art method of assembly, prior to assembling the pin and box coupling members 10,12, a thread-locking epoxy or adhesive is typically applied to the externally threaded insert 16 and the radial contact shoulder 24 of the pin coupling member 10. The externally threaded insert 16 is inserted into either the first or second end 32,34 of the box coupling member 12 and is advanced along the internally threaded, axial bore 30 until the radial contact shoulder 24 of the pin coupling member 10 approaches, but does not yet fully contact, the first or second end 32,34 of the box coupling's tubular body 28.

A tension rod, commonly called a ready rod or bolt (not shown) having an external thread at one end matching the profile of the internally threaded counterbore 22, is inserted through the axial bore 30 of the box coupling member 12 and is threaded into the internally threaded counterbore 22. The shear neck 18 is placed into tension by pulling upwardly on the tension rod. With the tension rod and shear neck 18 under tension, the box coupling member body 12 is further advanced along the externally threaded insert 16 until the tubular body 28 firmly contacts the radial contact shoulder 24 of the pin coupling member 10. Contact between the tubular body 28 of the box coupling member 12 and the radial contact shoulder 24 of the pin coupling member 10 acts to maintain the pretension in the shear neck 18. The tensile load on the tension rod is then released and the tension rod is unthreaded and removed from the assembly 1. The assembled shear coupling 1 is unused for sufficient time to permit the thread-locking epoxy to dry and harden.

Embodiments of the Invention

Figure 4:
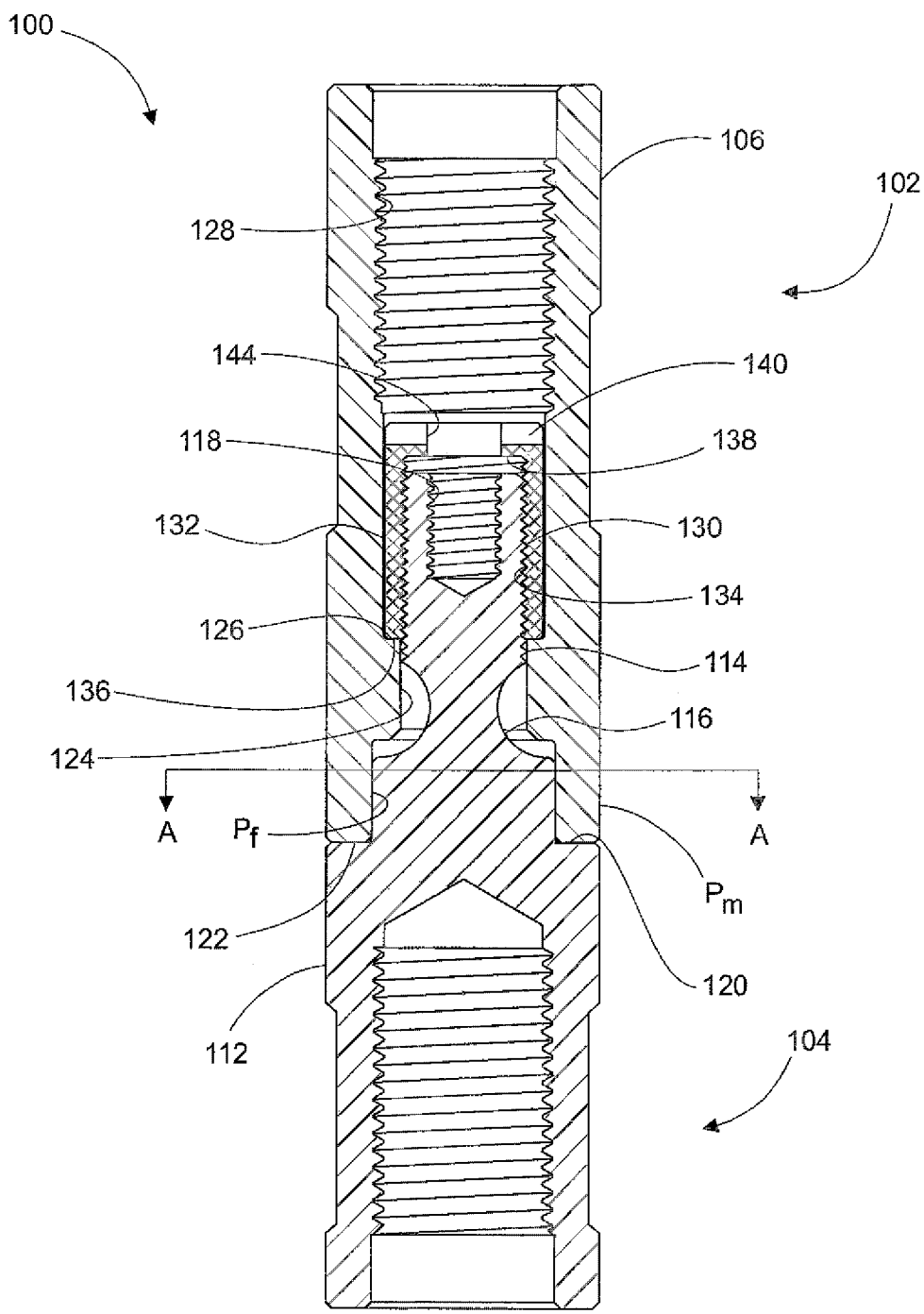
FIG. 4 is a longitudinal sectional view of an assembled shear coupling assembly according to FIG. 3, the first and second coupling members being box couplings.
Figure 5:
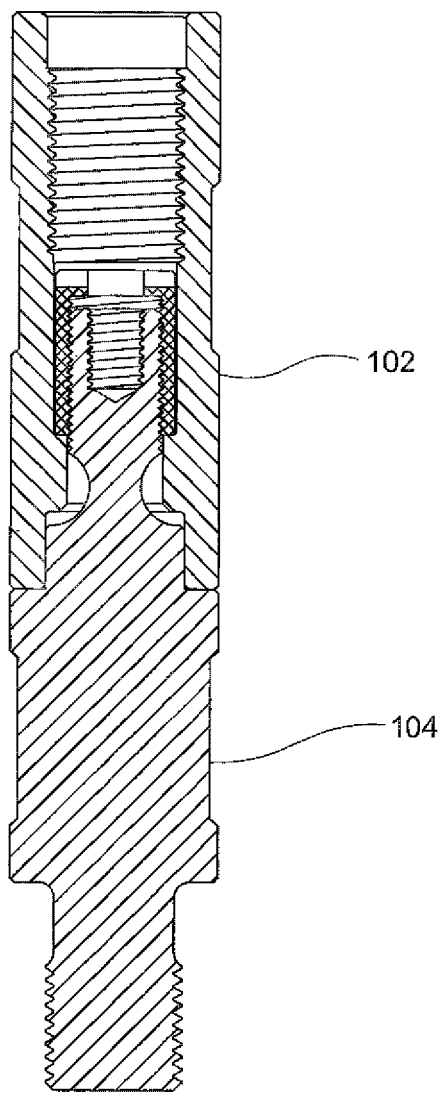
FIG. 5 is a longitudinal sectional view of an assembled shear coupling assembly according to an embodiment of the invention wherein the first coupling member is a box coupling member and the second coupling member is a pin coupling member.

As shown in FIGS. 3-5, a shear coupling assembly 100 according to embodiments of the invention, for use in both reciprocating and rotary pumping applications, driveably connects a first coupling member 102 and a second coupling member 104. The first and second coupling members 102, 104 are driveably connected both axially and rotationally as is described herein. The rotational connection is by means other than at a shear neck 116 to prevent rotational loads from affecting the design purpose of the shear neck 116. A locking member 130 connects axially between the first and second coupling members 102,104.

Having reference to FIGS. 4 and 5, and as one of skill in the art would appreciate, the second coupling member 104 can have either pin or box coupling ends for connection between the pump and the rod string, resulting conventionally in a box/box (FIG. 4) or a box/pin (FIG. 5) combination. Thread sizes for the box and pin couplings within a shear coupling assembly 100 can be the same or can be different, resulting in a crossover arrangement suitable in some applications, as is understood in the art.

Having reference again to FIGS. 3 and 4, the first coupling member 102 comprises a tubular body 106 having an internal, axial bore 108 formed therethrough for receiving at least a portion of the second coupling member 104 therein. The internal axial bore 108 comprises a lower portion 110 having a substantially irregular female profile $P_f$ formed therein.

The second coupling member 104, as in the prior art, comprises a cylindrical body 112 having an externally threaded insert member 114 extending axially outwardly therefrom and connected to the body 112 by a shear neck 116 designed to part under design loads. In the embodiment shown herein, the shear neck 116 has a reduced section. While referred to in the industry as a shear neck, it is believed the parting is a tensile failure. The insert member 114 is bored with an internally threaded axial counterbore 118 used to pretension the shear neck 116 during assembly, as described for the prior art shear coupling assembly 1.

Unlike the prior art, the cylindrical body 112, below the shear neck 116, further comprises a substantially irregular male profile portion $P_m$ which acts to engage the substantially irregular female profile $P_f$ formed in the axial bore 108 of the first coupling member 102, when inserted therein. Thus, when the male and female substantially irregular profiles $P_m$, $P_f$ are mated, the first and second coupling members 102,104 are rotationally, driveably connected, permitting the transfer of torque therebetween for co-rotation of the first coupling member 102 with the second coupling member 104 during rotary pumping operations.

As in the prior art shear coupling shown in FIG. 1, the cylindrical body 112 of the second coupling member 104 further comprises a radial contact shoulder 120. The radial contact shoulder 120 extends radially outwardly below the shear neck 116 and the substantially irregular male profile $P_m$.

As shown in FIGS. 6-12, the substantially irregular male profile $P_m$ and substantially irregular female profile $P_f$ are radially variable about the circumference of the profile $P_f, P_m$ so that the profile $P_f, P_m$ of one of the coupling members 102,104 interferes with the profile $P_f, P_m$ of the other of the coupling members 102,104.

Figure 6:
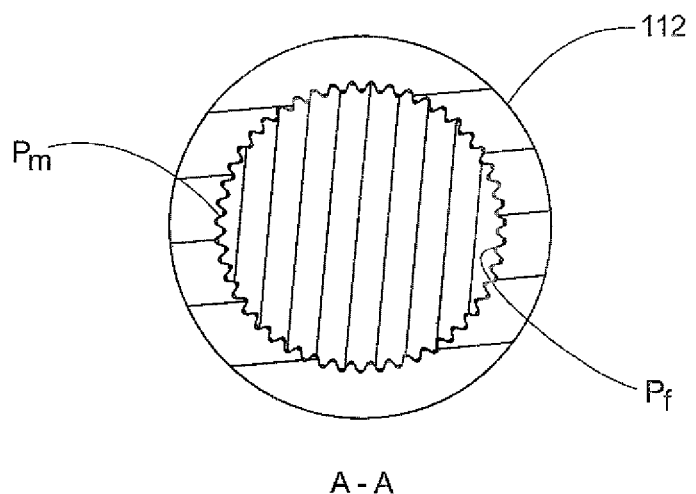
FIG. 6 is a cross-sectional view of the shear coupling assembly of FIG. 4 along lines A-A, substantially irregular mated male and female profiles being serrated profiles.
Figure 9:
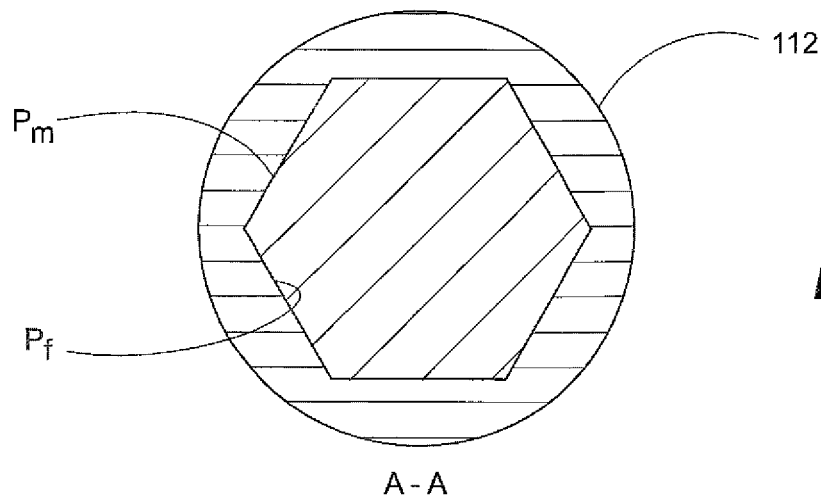
FIG. 9 is a cross-sectional view of alternate substantially irregular mated male and female profiles, being polygons having six sides.
Figure 8:
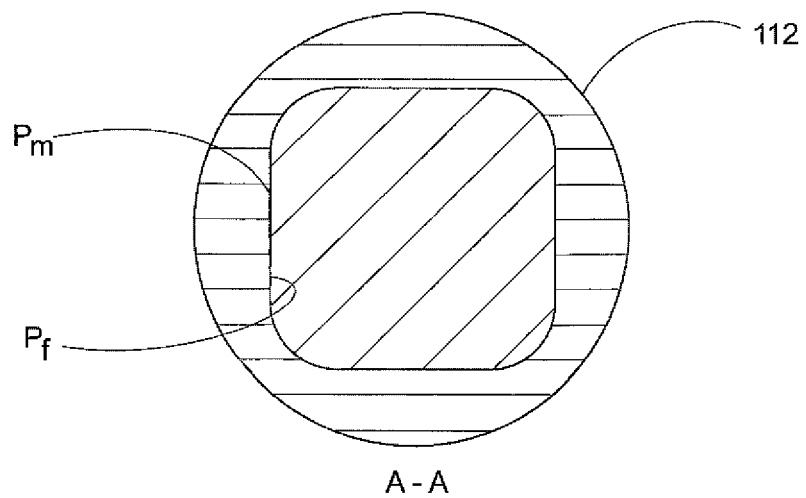
FIG. 8 is a cross-sectional view of alternate substantially irregular mated male and female profiles being polygons having four sides.

Having reference to FIG. 6, and in an embodiment of the invention, the substantially irregular male and female profiles $P_m$, $P_f$ are substantially circular, serrated or splined profiles. One suitable spline profile is a 30° pressure angle, fillet root side fit, 32/64 pitch with 48 teeth, according to ANSI standard ANSI 92.1. As one of skill would understand, other serrated or splined profiles applied to the torque transmitting profiles $P_m$, $P_f$ of the shear coupling assembly 100 would also be suitable.

Figure 7:
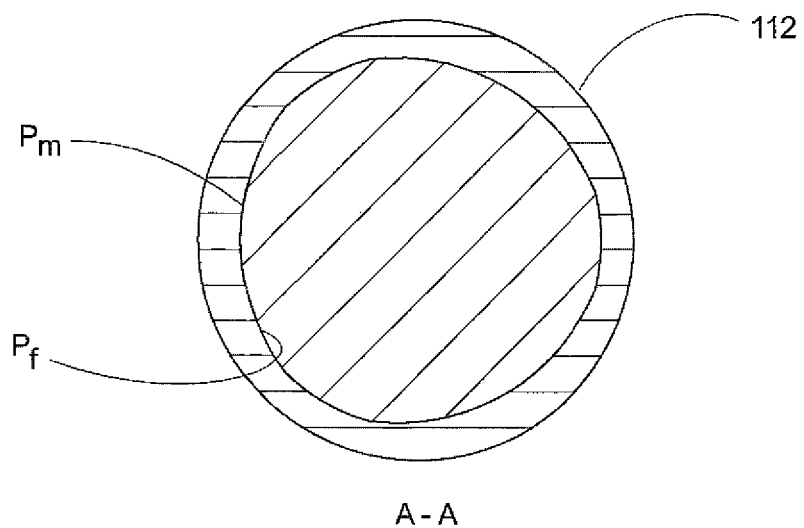
FIG. 7 is a cross-sectional view of alternate, substantially irregular, mated male and female profiles being a flat projection of a spherical triangle.
Figure 12:
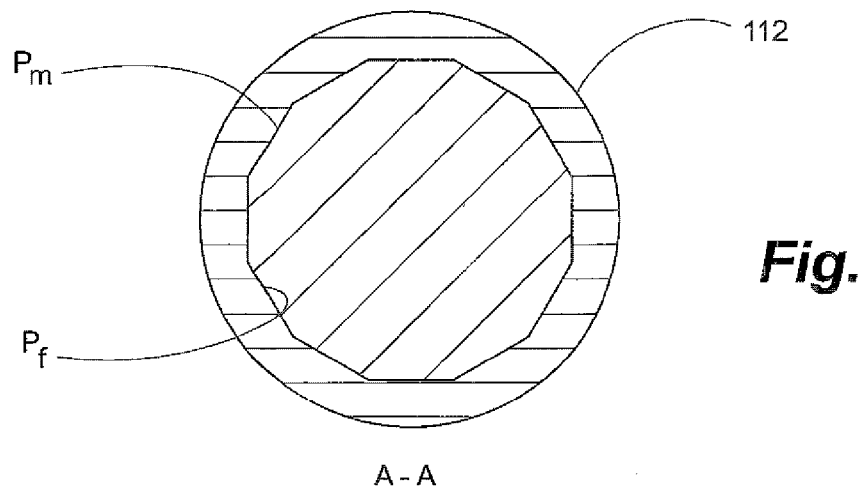
FIG. 12 is a cross-sectional view of alternate substantially irregular mated male and female profiles, being polygons having twelve sides.
Figure 11:
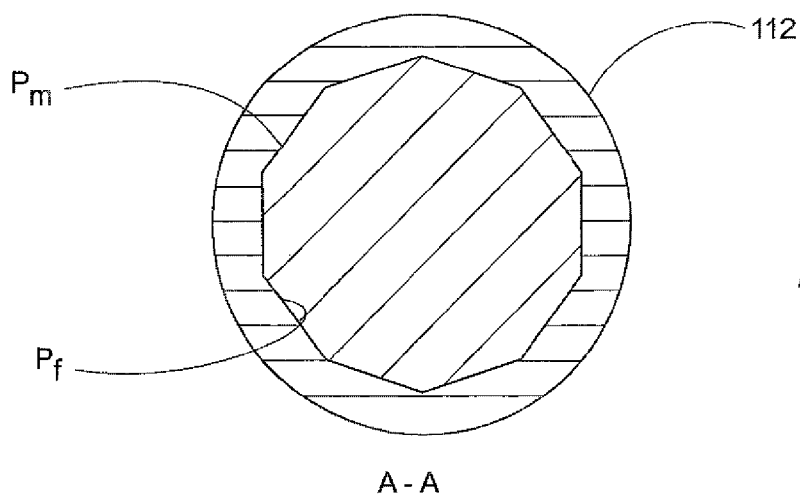
FIG. 11 is a cross-sectional view of alternate substantially irregular mated male and female profiles, being polygons having ten sides.
Figure 10:
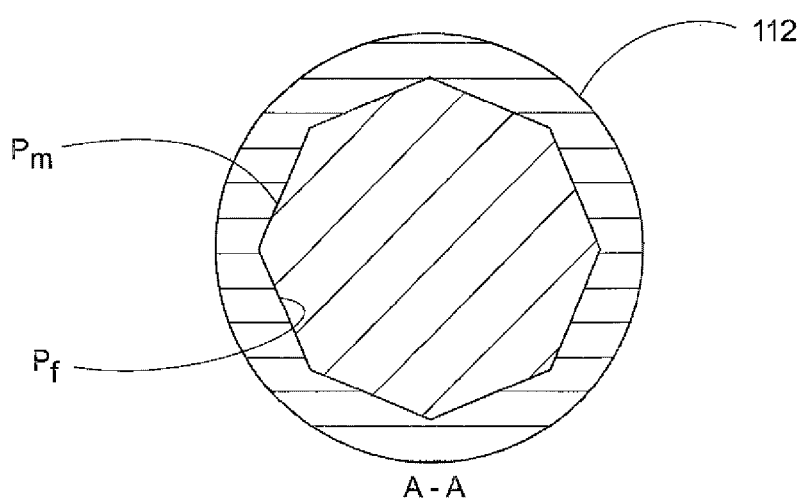
FIG. 10 is a cross-sectional view of alternate substantially irregular mated male and female profiles, being polygons having eight sides.

In embodiments of the invention, shown in FIG. 7, the substantially irregular male profile $P_m$ and the substantially irregular female profile $P_f$ have cross-sectional areas enclosed by curves having three sides; in other words, substantially spherical triangles.

As shown in FIGS. 8-12, the substantially irregular male profile $P_m$ and substantially irregular female profile $P_f$ are polygons having four or more sides.

Having reference again to FIG. 4, the substantially irregular female profile $P_f$ is greater in axial length than that of the substantially irregular male profile $P_m$ to ensure that a lower end 122 of the first coupling member's body 106 fully engages the radial contact shoulder 120 of the second coupling member 104 when assembled.

The axial bore 108 of the first coupling member 102 further comprises a restricted portion 124 above the substantially irregular female profile $P_f$. The restricted portion 124 is sized to permit passage of the insert member 114 of the second coupling member 104 therethrough, but is smaller in diameter than the substantially irregular male profile $P_m$ of the second coupling member 104. The axial bore 128 above the restricted portion 124 is substantially circular, the restricted portion 124 forming a radially inwardly extending, upper shoulder 126 between the substantially circular portion 128 and the substantially irregular female profile $P_f$. As a result of the greater relative length of the substantially irregular female profile $P_f$ over the substantially irregular male profile $P_m$ does not contact the restricted portion 124.

Having reference to FIGS. 3 and 4, in order to ensure the first and second coupling members 102, 104 remain axially engaged when assembled, the locking member 130 is used. The locking member 130 engages between the first coupling member 102 and the second coupling member 104 for preventing axial separation of the second coupling member 104 from the first coupling member 102, when assembled.

In an embodiment of the invention, as shown in FIGS. 3, 4 and 13, the locking member 130 comprises a cylindrical body 132 having a threaded axial bore 134 formed therein. The cylindrical body 132 has a diameter sized so as to be insertable downward into the circular portion 128 of the axial bore 108 of the first coupling member 102 for threading onto the externally threaded insert member 114 of the second coupling member 104 which extends above the upper shoulder 126 when inserted therein. The locking member 130 is threaded onto the externally threaded insert member 114 until a lower end 136 of the locking member 130 engages the upper shoulder 126 in the bore 108. Thus, the second coupling member 104 cannot separate from the first coupling member 102 under normal axial loading.

Advantageously, when assembled, the torque transferring profiles $P_m$, $P_f$ and the shear neck 116 are protected within the assembled shear coupling assembly 100 from exposure to potentially corrosive wellbore fluids for improving fatigue resistance.

As shown in FIG. 4, the cylindrical body 132 of the locking member 130 is longer than the insert member 114 on the second coupling member 104 to ensure that the lower end 136 of the locking member 130 engages the upper shoulder 126 in the first coupling's axial bore 108 before a top 138 of the locking member's bore 132 engages the insert member 114.

Having reference to FIG. 13, as an aid for assembly, the locking member 130 further comprises engagement means 140 formed in an upper surface 142 of the cylindrical body 132 for engaging a tool end for threading the locking member 130 onto the insert member 114. In an embodiment, the engagement means 140 is a profile, such as a diametral slot, which is compatible with the tool end.

Figure 14:
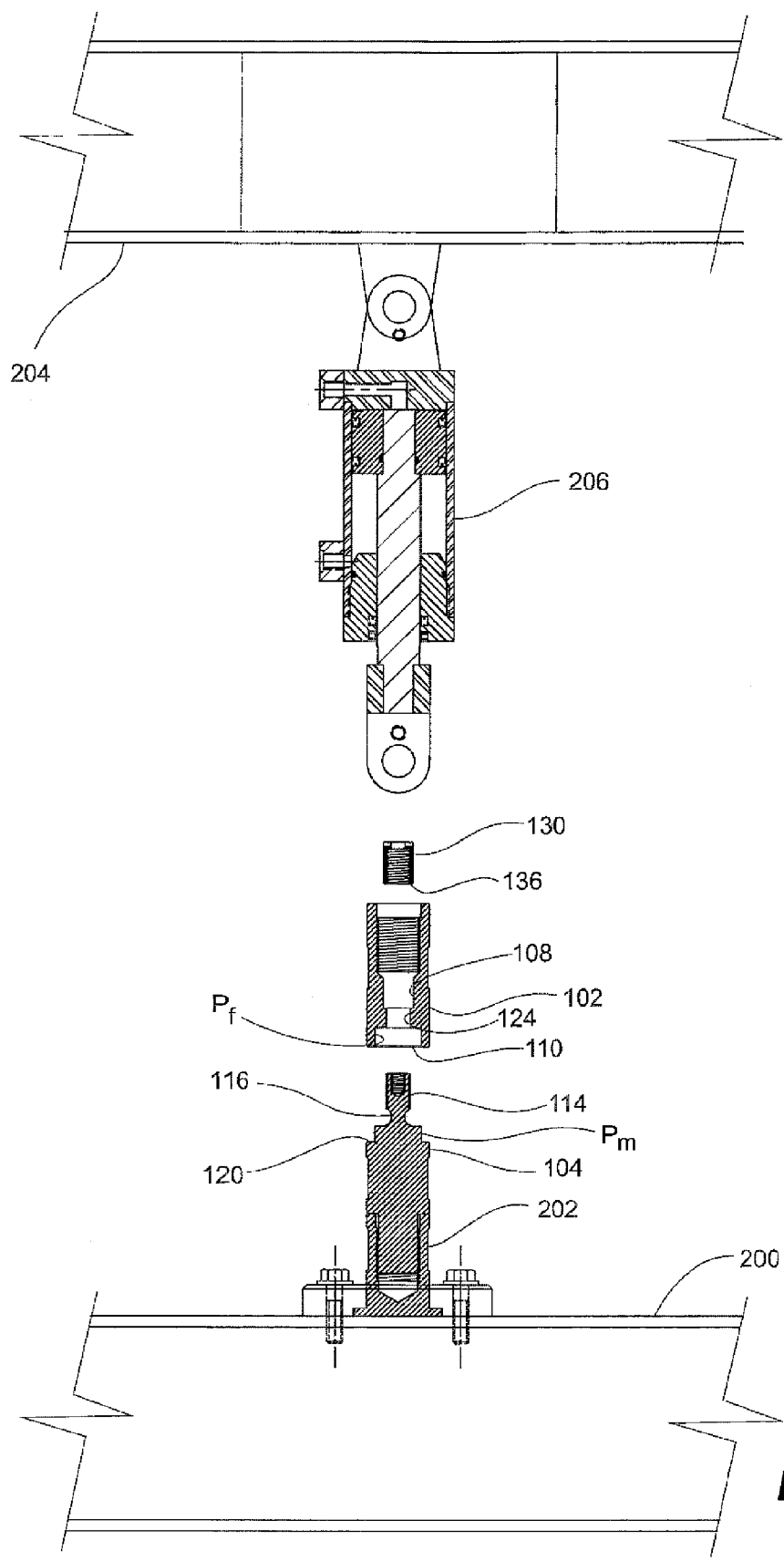
FIG. 14 is an partially exploded longitudinal sectional view of a shear coupling according to an embodiment of the invention and apparatus for assembly being connected thereto.
Figure 15:
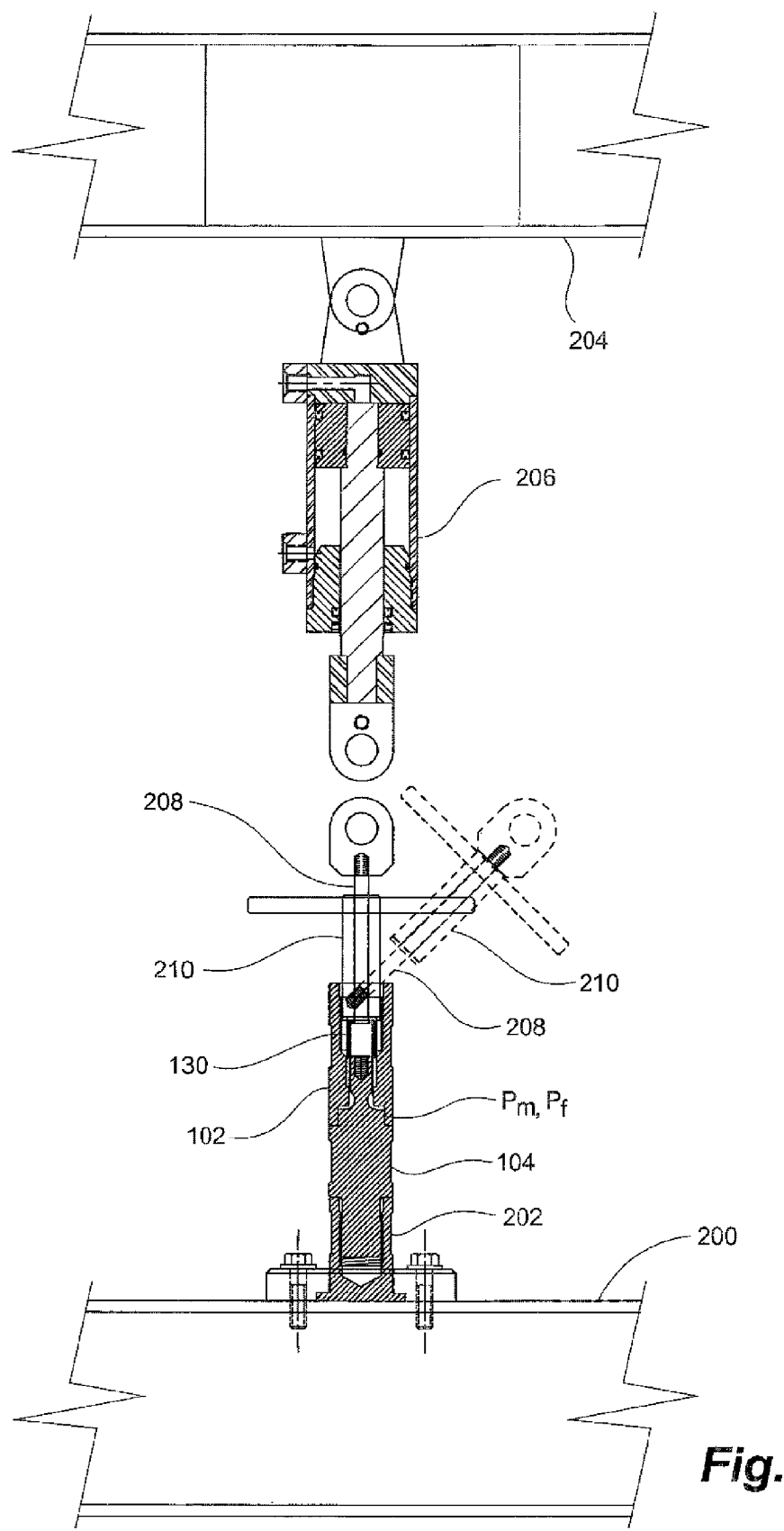
FIG. 15 is a partial longitudinal sectional view of an assembled shear coupling and apparatus for assembly according to FIG. 14.

Having reference to FIGS. 13-15, to set design tensile loading limits and to increase fatigue resistance, it is generally desirable to apply a pretension to the shear neck 116 during assembly. Best seen in FIG. 13, and in an embodiment, the upper surface 142 of the locking member's cylindrical body 132 further comprises an opening 144 through which a tension rod 208 can extend for applying pretension to the shear neck 116. After insertion of the locking member 130 downwardly into the axial bore 108 and prior to threading the locking member 130 onto the insert member 114, the tension rod 208 is inserted through the opening 144 for engagement with the counterbore 118 in the insert member 114. An upward pulling force is applied to the tension rod 208 and while maintaining the upward pulling force, the locking member 130 is rotated for fully engaging with the insert member 114 for axially driveably connecting the first and second coupling members 102, 104 and for maintaining the pretension in the shear neck 116.

Method of Assembly of Shear Coupling

As one of skill in the art will appreciate there are a number of ways in which embodiments of the invention may be assembled. Applicant has described herein one such method of assembly.

Having reference to FIGS. 14-16B and in an embodiment of the invention, the second coupling member 104 is affixed to a base 200, such as by an anvil 202 configured for either a pin coupling (FIG. 16A) or a box coupling (FIG. 16B), connected to the base 200. Typically, the base 200 forms part of a frame 204 to which a hydraulic cylinder 206 is connected for applying pretension to the shear neck 116 during assembly.

The first coupling member 102 is lowered onto the second coupling member 104, inserting the insert member 114 into the lower end 110 of the axial bore 108 of the first coupling member 102. The insert member 114 passes through the restricted portion 124 of the axial bore 108. The first coupling member 102 is lowered until the lower end 122 of the first coupling member 102 contacts the radial contact shoulder 120 of the second coupling member 104. The substantially irregular male and female profiles $P_m$, $P_f$ of the first and second coupling members 102, 104 are mated so as to permit transfer of torque therebetween. The locking member 130 is inserted downwardly into the upper portion 128 of the axial bore 108 of the first coupling member 102 for threaded connection to the insert member 114 of the second coupling member 104.

As shown in FIGS. 14 and 15, where a pretension is to be applied to the shear neck 116, a tension rod 208 is inserted into the axial bore 108 of the first coupling member 102 after insertion of the locking member 130. The tension rod 208 passes through the opening 144 in the upper surface 142 of the locking member 130 and engages with the threaded counterbore 118 in the insert member 114. As in the prior art, an upward pulling force is applied to the tension rod 208 at a predetermined force, such as by the hydraulic cylinder 206. In this embodiment, while the upward pulling force is maintained, the locking member 130 is threaded onto the insert member 114 until the lower end 136 of the locking member 130 engages the upper shoulder 126 in the first coupling member's axial bore 108. Thereafter, the tension rod 208 is released from the counterbore 118 and the tension rod 208 is removed from the axial bore 108 of the first coupling member 102.

As shown in FIG. 15, prior to connecting the tension rod 208 to the hydraulic cylinder 206, an engagement tool 210 having a tool end 212 is inserted into the axial bore 108 of the first coupling member 102 for engaging the engagement means 140 on the upper surface 142 of the locking member 130 for threading the locking member 130 therein. In the embodiment shown, the engagement tool 210 is integral with the tension rod 208 and is independently rotatable thereabout. Alternatively, the engagement tool 210 can be positioned for rotation about the tension rod 208 after the tension rod 208 is engaged with the counterbore 118 of the insert member 114.

The engagement tool 210 is thereafter rotated with the tool end 212 engaged in the diametral slot 140 to thread the locking member 130 onto the insert member 114. The locking member 130 is threaded until the lower end 136 of the locking member 130 engages the upper shoulder 126 in the first coupling member's axial bore 108. The engagement tool 210 is thereafter released from the locking member 30 for retraction from the axial bore 108.

As with the prior art shear coupling assembly, a thread-locking epoxy or adhesive is typically applied to the radial contact shoulder 120 of the second coupling member 104 and to the threads of the insert member 114 and locking member 130, prior to assembly.

The invention claimed is:

1. A shear coupling assembly for driveably connecting between a downhole pump and a downhole end of a rod string comprising:
   a first coupling member, adapted for connection to one or other of the pump or rod string, having a first body and an axial bore formed therethrough, at least a portion of the axial bore having a female profile formed therein;
   a second coupling member, adapted for connection to one or other of the pump or rod string, having a second body, an insert member extending axially therefrom, a shear neck connecting between the second body and the insert member, and a male profile formed on the second body adjacent the shear neck, the male profile of the second coupling member mating with the female profile of the first coupling member and driveably engaging the first and second coupling members in a radial connection for co-rotation therebetween; and
   a locking member inserted into the axial bore of the first coupling member, the locking member engaging between the axial bore of the first coupling member and the insert member of the second coupling member and providing an axial connection therebetween.

2. The shear coupling assembly of claim 1 further comprising:
   a shoulder formed within the axial bore of the first coupling member and external threads formed on the insert member of the second coupling member;
   the locking member comprising a third body having an internally threaded bore formed therein for threaded engagement with the insert member when inserted into the axial bore of the first coupling member,
   wherein the locking member's third body engages the shoulder for maintaining axial coupling therebetween.

3. The shear coupling assembly of claim 1 wherein the insert member further comprises an axial counterbore formed therein adapted to receive a tension rod for applying a pretension to the shear neck, the pretension being applied prior to engagement of the locking member, the locking member further acting to maintain the pretension in the shear neck.

4. The shear coupling assembly of claim 2 further comprising engagement means formed at an end of the locking member adapted for receiving a tool end for rotating the locking member for threaded engagement with the external threads on the insert member of the second coupling member.

5. The shear coupling assembly of claim 4 wherein the engagement means formed at the end of the locking member is a profile adapted to co-operate with the tool end for rotating the locking member.

6. The shear coupling assembly of claim 1 wherein the male profile and the female profile of the first and second coupling members are:
   radially variable for interference therebetween;
   cross-sectional areas enclosed by curves and have three sides;
   polygons having four sides;
   polygons having more than four sides; or serrated substantially circular profiles.

7. The shear coupling assembly of claim 1 wherein the shear neck has a section reduced in cross-section compared to the insert member.

8. The shear coupling assembly of claim 1 wherein the second coupling member further comprises a radial contact shoulder formed about the second body adjacent the male profile for engaging an end of the first body of the first coupling member.

9. The shear coupling assembly of claim 8 wherein the male profile of the second coupling member has a section reduced in cross-section compared to the second body for forming the radial contact shoulder.

10. A method of assembling a shear coupling assembly, the method comprising:
    inserting an insert member of a second coupling member into a first end of an axial bore of a first coupling member, the insert member passing a shoulder in the axial bore;
    mating a male profile of the second coupling member with a female profile of the first coupling member in a radial connection for co-rotation therebetween;
    inserting a locking member into a second end of the axial bore of the first coupling member; and
    axially connecting the locking member with the insert member with the locking member engaging the shoulder for maintaining an axial connection therebetween.

11. The method of claim 10 further comprising prior to axially connecting the locking member onto the insert member,
    applying a pretension to a shear neck disposed on the second coupling member adjacent the male profile.

12. The method of claim 10 wherein the axial connection is threading, the method further comprises:
    engaging an end of a tool with engagement means formed in the locking member; and
    rotating the tool for threading the locking member onto the insert member.

13. The method of claim 10 further comprising prior to threading the locking member onto the insert member, applying a thread-locking adhesive to external threads of the insert member.

14. The method of claim 10 wherein the second coupling member further comprises a radial contact shoulder formed about a second body, adjacent the male profile, and wherein the method further comprises, prior to threading the locking member onto the insert member, applying a thread-locking adhesive to external threads of the insert member and the radial contact shoulder.

15. The method of claim 11 wherein applying the pretension to the shear neck of the second coupling member further comprises:
    inserting a tension rod through an axial bore in the locking member for threading into an axial counterbore of the insert member;
    pulling on the tension rod for applying the pretension to the shear neck;
    while maintaining the pulling, axially coupling the locking member with the insert member with the locking member engaging the shoulder for maintaining the axial connection therebetween and for maintaining the pretension applied to the shear neck; and
    thereafter releasing the tension rod from the axial counterbore of the insert member.

16. A shear coupling assembly for driveably connecting between a downhole pump and a downhole end of a rod string comprising:
    a first coupling member, adapted for connection to one or other of the pump or rod string, having a tubular body and an axial bore formed therethrough, at least a portion of the axial bore having a substantially irregular female profile formed therein, the first coupling member having an upper shoulder formed within the axial bore;
    a second coupling member, adapted for connection to one or other of the pump or rod string, having a cylindrical body, a cylindrical insert member extending axially upward therefrom, a shear neck connecting between the cylindrical body and the cylindrical insert member, and a substantially irregular male profile formed on the cylindrical body below the shear neck for mating with the substantially irregular female profile of the first coupling member, for driveably engaging the first and second coupling members for co-rotation, the second coupling member having external threads formed on the cylindrical insert member; and a locking member for insertion into the axial bore of the first coupling member for engagement between the axial bore of the first coupling member and the cylindrical insert member of the second coupling member for axial connection therebetween, the locking member comprising a cylindrical body having an internally threaded bore formed therein for threaded engagement with the cylindrical insert member when inserted into the axial bore of the first coupling member, wherein a lower end of the locking member's cylindrical body engages the upper shoulder of the first coupling member for maintaining axial coupling therebetween.

17. The shear coupling assembly of claim 16 wherein the cylindrical insert member further comprises an axial counterbore formed therein adapted to receive a tension rod for applying a pretension to the shear neck, the pretension being applied prior to engagement of the locking member, the locking member further acting to maintain the pretension in the shear neck.

18. The shear coupling assembly of claim 16 further comprising engagement means formed at an upper end of the locking member adapted for receiving a tool end for rotating the locking member for threaded engagement with the external threads on the cylindrical insert member of the second coupling member.

19. The shear coupling assembly of claim 16 wherein the substantially irregular male profile and the substantially irregular female profile of the first and second coupling members are:
   radially variable for interference therebetween;
   cross-sectional areas enclosed by curves and have three sides;
   polygons having four sides;
   polygons having more than four sides; or
   serrated substantially circular profiles.

20. The shear coupling assembly of claim 16 wherein the shear neck has a section reduced in cross-section compared to the cylindrical insert member.

21. The shear coupling assembly of claim 16 wherein the second coupling member further comprises a radial contact shoulder formed about the cylindrical body below the substantially irregular male profile for engaging a lower end of the tubular body of the first coupling member.

22. The shear coupling assembly of claim 21 wherein the substantially irregular male profile of the second coupling member has a section reduced in cross-section compared to the cylindrical body for forming the radial contact shoulder.

23. A shear coupling assembly for driveably connecting between a downhole pump and a downhole end of a rod string comprising:
   a first coupling member, adapted for connection to one or other of the pump or rod string, having a tubular body and an axial bore formed therethrough, at least a portion of the axial bore having a substantially irregular female profile formed therein;
   a second coupling member, adapted for connection to one or other of the pump or rod string, having a cylindrical body, a cylindrical insert member extending axially upward therefrom, a shear neck connecting between the cylindrical body and the cylindrical insert member, and a substantially irregular male profile formed on the cylindrical body below the shear neck for mating with the substantially irregular female profile of the first coupling member, for driveably engaging the first and second coupling members for co-rotation; and
   a locking member for insertion into the axial bore of the first coupling member for engagement between the axial bore of the first coupling member and the cylindrical insert member of the second coupling member for axial connection therebetween,
   wherein the cylindrical insert member comprises an axial counterbore formed therein adapted to receive a tension rod for applying a pretension to the shear neck, the pretension being applied prior to engagement of the locking member, the locking member further acting to maintain the pretension in the shear neck.

24. The shear coupling assembly of claim 23 further comprising engagement means formed at an upper end of the locking member adapted for receiving a tool end for rotating the locking member for threaded engagement with the external threads on the cylindrical insert member of the second coupling member.

25. The shear coupling assembly of claim 23 wherein the substantially irregular male profile and the substantially irregular female profile of the first and second coupling members are:
   radially variable for interference therebetween;
   cross-sectional areas enclosed by curves and have three sides;
   polygons having four sides;
   polygons having more than four sides; or serrated substantially circular profiles.

26. The shear coupling assembly of claim 23 wherein the shear neck has a section reduced in cross-section compared to the cylindrical insert member.

27. The shear coupling assembly of claim 23 wherein the second coupling member further comprises a radial contact shoulder formed about the cylindrical body below the substantially irregular male profile for engaging a lower end of the tubular body of the first coupling member.

28. The shear coupling assembly of claim 27 wherein the substantially irregular male profile of the second coupling member has a section reduced in cross-section compared to the cylindrical body for forming the radial contact shoulder.

29. A shear coupling assembly for driveably connecting between a downhole pump and a downhole end of a rod string comprising:
   a first coupling member, adapted for connection to one or other of the pump or rod string, having a tubular body and an axial bore formed therethrough, at least a portion of the axial bore having a substantially irregular female profile formed therein;
   a second coupling member, adapted for connection to one or other of the pump or rod string, having a cylindrical body, a cylindrical insert member extending axially upward therefrom, a shear neck connecting between the cylindrical body and the cylindrical insert member, and a substantially irregular male profile formed on the cylindrical body below the shear neck for mating with the substantially irregular female profile of the first coupling member, for driveably engaging the first and second coupling members for co-rotation; and
   a locking member for insertion into the axial bore of the first coupling member for engagement between the axial bore of the first coupling member and the cylindrical insert member of the second coupling member for axial connection therebetween, wherein the second coupling member comprises a radial contact shoulder formed about the cylindrical body below the substantially irregular male profile for engaging a lower end of the tubular body of the first coupling member.

30. The shear coupling assembly of claim 29 further comprising engagement means formed at an upper end of the locking member adapted for receiving a tool end for rotating the locking member for threaded engagement with the external threads on the cylindrical insert member of the second coupling member.

31. The shear coupling assembly of claim 29 wherein the substantially irregular male profile and the substantially irregular female profile of the first and second coupling members are:

radially variable for interference therebetween;

cross-sectional areas enclosed by curves and have three sides;

polygons having four sides;

polygons having more than four sides; or serrated substantially circular profiles.

32. The shear coupling assembly of claim 29 wherein the shear neck has a section reduced in cross-section compared to the cylindrical insert member.

33. The shear coupling assembly of claim 29 wherein the substantially irregular male profile of the second coupling member has a section reduced in cross-section compared to the cylindrical body for forming the radial contact shoulder.

* * * * *